US012669460B2

(12) United States Patent
Nagai

(10) Patent No.: US 12,669,460 B2
(45) Date of Patent: Jun. 30, 2026

(54) MEASURING DEVICE, MEASURING SYSTEM, AND MEASURING METHOD

(71) Applicant: HIOKI E.E. CORPORATION, Nagano (JP)

(72) Inventor: Hideyuki Nagai, Nagano (JP)

(73) Assignee: HIOKI E.E. CORPORATION, Nagano (JP)

( * ) Notice: Subject to any disclaimer, the term of this patent is extended or adjusted under 35 U.S.C. 154(b) by 177 days.

(21) Appl. No.: 18/699,765

(22) PCT Filed: Sep. 28, 2022

(86) PCT No.: PCT/JP2022/036196
§ 371 (c)(1),
(2) Date: Apr. 9, 2024

(87) PCT Pub. No.: WO2023/063083
PCT Pub. Date: Apr. 20, 2023

(65) Prior Publication Data
US 2024/0410851 A1      Dec. 12, 2024

(30) Foreign Application Priority Data

Oct. 11, 2021 (JP) ................................. 2021-166846
Sep. 8, 2022 (JP) ................................. 2022-143278

(51) Int. Cl.
*G01N 27/20* (2006.01)
*G01N 27/04* (2006.01)

(52) U.S. Cl.
CPC ........... *G01N 27/20* (2013.01); *G01N 27/041* (2013.01); *G01N 27/045* (2013.01)

(58) Field of Classification Search
CPC ..... B23K 9/0953; B23K 31/125; B23K 9/095
See application file for complete search history.

(56) References Cited

U.S. PATENT DOCUMENTS 6,338,765 B1 * 1/2002 Statnikov ............... C21D 10/00
148/558
2004/0060913 A1 * 4/2004 Ueyama ................. B23K 9/092
219/130.21

(Continued)

FOREIGN PATENT DOCUMENTS

EP        0277467 A1     8/1988
JP        56-94255 A      7/1981

(Continued)

OTHER PUBLICATIONS

Foreign Communication from a Related Counterpart Application, Extended European Search Report dated Aug. 8, 2025, European Application No. 22880779.8 filed on Sep. 28, 2022.

*Primary Examiner* — Huy Q Phan
*Assistant Examiner* — Temilade S Rhodes-Vivour
(74) *Attorney, Agent, or Firm* — Conley Rose, P.C.

(57) ABSTRACT

A measuring device measures a state of a plurality of weld zones formed when a weldment is welded to a workpiece at a plurality of locations. This measuring device includes a plurality of application circuits that apply a current to each of one or more weld zones exclusively selected among the plurality of weld zones, and a detection circuit that detects a voltage obtained by combining voltages indicating magnitudes of voltage drops generated respectively by the plurality of more weld zones due to the application of the current. The measuring device further includes a processor that outputs information indicating the state of the plurality of weld zones on the basis of the voltages detected by the detection circuit.

9 Claims, 10 Drawing Sheets

(56)          References Cited

U.S. PATENT DOCUMENTS

| | | | | |
|---|---|---|---|---|
| 2011/0282593 | A1* | 11/2011 | Nickel | G01R 31/66 |
| | | | | 324/533 |
| 2012/0286945 | A1 | 11/2012 | Lev et al. | |
| 2016/0260261 | A1* | 9/2016 | Hsu | B23K 9/32 |
| 2017/0032281 | A1* | 2/2017 | Hsu | G06Q 10/06 |
| 2017/0322168 | A1 | 11/2017 | Lupienski et al. | |
| 2021/0379689 | A1* | 12/2021 | Takahashi | B23K 11/11 |

FOREIGN PATENT DOCUMENTS

| | | | |
|---|---|---|---|
| JP | 62-3654 | A | 1/1987 |
| JP | 7-130293 | A | 5/1995 |
| JP | 2003-14676 | A | 1/2003 |
| JP | 2008-241419 | A | 10/2008 |
| JP | 2011-203055 | A | 10/2011 |
| JP | 2014-151360 | A | 8/2014 |
| JP | 2019-60769 | A | 4/2019 |

* cited by examiner

LOW POTENTIAL ——→ HIGH POTENTIAL

| DEFECTIVE WELDING LOCATION | COMBINED VOLTAGE [µV] |
|---|---|
| NONE | 6.7 |
| ONE WELD ZONE 23a | 10.2 |
| ONE WELD ZONE 23b | 9.8 |
| ONE WELD ZONE 23c | 9.8 |
| ONE WELD ZONE 23d | 10.4 |
| TWO WELD ZONES 23a AND 23c | 14.4 |
| THREE WELD ZONES 23a, 23b, AND 23c | 20.8 |

FIG. 4

| DEFECTIVE WELDING LOCATION | COMBINED VOLTAGE [μV] |
|---|---|
| NONE | 10.1 |
| ONE WELD ZONE 23a | 11.3 |
| ONE WELD ZONE 23b | 16.6 |
| TWO WELD ZONES 23b AND 23d | 18.3 |

FIG. 8

MEASURING DEVICE, MEASURING SYSTEM, AND MEASURING METHOD

TECHNICAL FIELD

The present invention relates to a measuring device, a measuring system, and a measuring method for measuring a state of a weld zone.

BACKGROUND ART

JP 2019-60769 A discloses a device that, for a secondary battery including a weld zone where a tab group and a conductive member are welded to each other, measures a resistance value of the weld zone. Such a device measures a state of the weld zone by applying a current from one first probe to the weld zone and detecting an output signal from a pair of second probes brought into contact with different areas around the weld zone.

SUMMARY OF INVENTION

In a measuring device such as described above, in order to measure the weld zone, it is necessary to space apart, around the weld zone, the pair of probes for detecting voltage. Therefore, in a case in which a plurality of weld zones are present, when a first weld zone is measured and then another weld zone formed in a different location is measured, it is necessary to newly arrange the pair of probes around the other weld zone.

Thus, it is necessary to change the contact positions of the pair of probes for each weld zone to be measured, resulting in the problem that measurement of all weld zones requires a long measurement time.

The present invention has been made in view of such problems, and an object of the present invention is to shorten the time required to measure a state of a plurality of weld zones.

According to an aspect of the present invention, a measuring device measures a state of a plurality of weld zones formed when a weldment is welded to a workpiece at a plurality of locations. The measuring device includes a plurality of application circuits configured to apply a current to each of one or more weld zones exclusively selected among the plurality of weld zones, a detection circuit configured to detect a voltage obtained by combining voltages indicating magnitudes of voltage drops generated respectively by the plurality of weld zones due to the application of the current, and a processor configured to output information indicating the state of the plurality of weld zones on the basis of the voltages combined.

According to this aspect, the voltage obtained by combining the voltages generated by each of the weld zones by applying the current to each of the one or more weld zones exclusively selected among the plurality of weld zones has a different value depending on the state of each weld zone. Therefore, by detecting the value of the combined voltage, it is possible to determine whether the state of the plurality of weld zones to which the current is applied is defective.

Accordingly, it is possible to shorten the time required for measuring the state of the plurality of weld zones as compared with a case in which current is applied to each weld zone and the voltage generated by the weld zone is detected each time.

BRIEF DESCRIPTION OF DRAWINGS

FIG. 4 is a table showing an example of a relationship between defective locations of the plurality of weld zones and voltage values of combined voltages detected by a detection circuit.

FIG. 8 is a table illustrating one example of a relationship between defective locations of a group of weld zones and voltage values of combined voltages.

DESCRIPTION OF EMBODIMENTS

Embodiments of the present invention will be described below with reference to the accompanying drawings. In this specification, the same elements are denoted by the same reference signs.

First Embodiment

Figure 1:
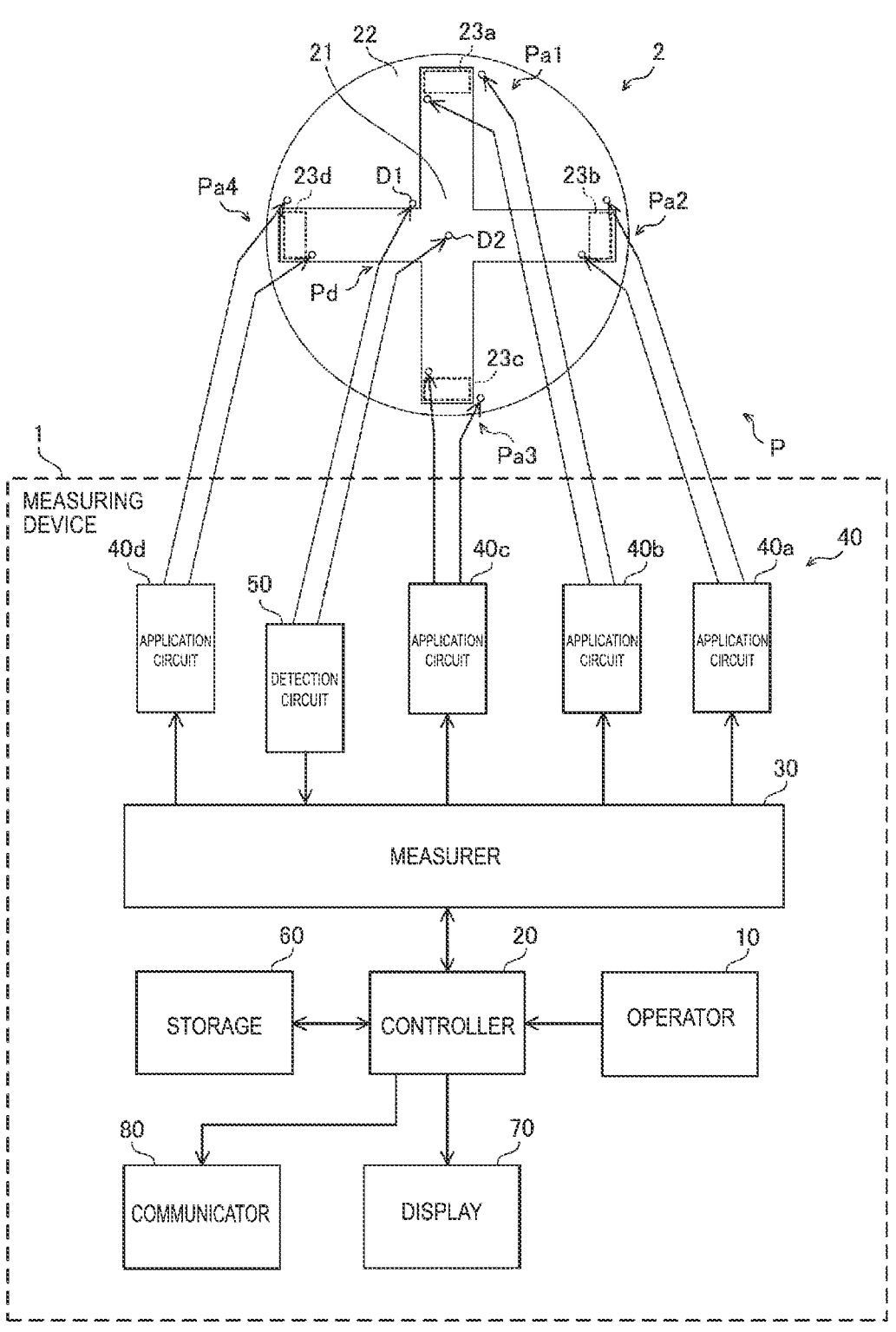
FIG. 1 is a diagram illustrating a configuration of a measuring device according to a first embodiment of the present invention.

FIG. 1 is a block diagram illustrating a configuration of a measuring device that measures a weld zone according to a first embodiment.

A measuring device 1 is a state measuring device for measuring a state of a plurality of weld zones formed on a measurement target 2. The plurality of weld zones to be measured are hereinafter also referred to as one group of weld zones.

The measurement target 2 is an assembly in which a weldment is welded to a workpiece at a plurality of locations. In the first embodiment, the measurement target 2 is an electrode component of a secondary battery having a cylindrical shape, and the workpiece is an electrode 22 constituting the electrode component.

The electrode component described above includes four weld zones 23a to 23d formed when a weldment 21 disposed on an outer side of the secondary battery is welded to the electrode 22 of the secondary battery at four locations. A portion of a back surface of the weldment 21 is welded to an outer surface of the electrode 22, and a front surface of the weldment 21 is connected to an external load device, such as an electric motor or an inverter, for example, via a power supply line or the like.

The measurement target 2 in the first embodiment is an electrode component used in an electric vehicle, and a current of several hundred amperes (A) may flow through the weld zones 23a to 23d. In such a case, in a defective state in which at least one of the weld zones 23a to 23d is not reliably welded, there is a concern that excessive heat may be generated or the weldment 21 may detach from the electrode 22.

As a countermeasure, the measuring device 1 measures the state of the weld zone 23*a* to 23*d* to determine whether the welding state of the measurement target 2 is defective. The measuring device 1 is constituted by one or more measuring instruments.

The measuring device 1 applies (supplies) a current to each of one or more of the weld zones exclusively selected among the group of weld zones 23*a* to 23*d*. In this state, the measuring device 1 can determine the state of the plurality of weld zones 23*a* to 23*d* by detecting a voltage obtained by combining voltages indicating magnitudes of voltage drops generated by each of the one or more weld zones. Hereinafter, a voltage obtained by combining the voltages applied to the voltage drops generated by the respective weld zones is referred to as a combined voltage.

In the first embodiment, the measuring device 1 includes a probe group P, an operator 10, a controller 20, a measurer 30, an application circuit 40 including a plurality of application circuits 40*a* to 40*d*, a detection circuit 50, a storage 60, a display 70, and a communicator 80.

The probe group P includes a plurality of pairs of application probes Pa1 to Pa4 and another pair of detection probes Pd.

The plurality of pairs of application probes Pa1 to Pa4 are formed of a plurality of conductive wires, each electrically connected at one end to both ends of the respective application circuits 40*a* to 40*d*, and a plurality of pairs of contacts (first contacts) each having conductivity and to which the other ends of the plurality of conductive wires are respectively electrically connected. The plurality of pairs of application probes Pa1 to Pa4 respectively come into contact with areas of both the weldment 21 and the electrode 22 in the vicinity of the plurality of weld zones 23*a* to 23*d*.

In the first embodiment, the four pairs of application probes Pa1 to Pa4 are used to apply a current to the weld zones 23*a* to 23*d*, respectively. For example, the pair of application probes Pa1 are disposed so that a virtual straight line connecting a contact portion of one application probe and a contact portion of the other application probe passes through the weld zone 23*a*. The same applies to the other pairs of application probes Pa2 to Pa4.

The pair of detection probes Pd is the other pair of contacts (second contacts) having conductivity and connected to both ends of the detection circuit 50. The pair of detection probes Pd are used to detect the combined voltage obtained by combining the voltages indicating the magnitudes of the voltage drops generated by each of the weld zones 23*a* to 23*d*.

The pair of detection probes Pd respectively come into contact with areas of the weldment 21 and the electrode 22 that are farther from the plurality of weld zones Pa1 to Pa4 than the areas of the weldment 21 and the electrode 22 with which, for each pair of application probes 23*a* to 23*d*, the pair of application probes come into contact.

For example, the pair of detection probes Pd respectively come into contact with areas of both the weldment 21 and the electrode 22 positioned on any one line passing from a center of gravity of a polygon formed by the plurality of weld zones 23*a* to 23*d* to midpoints of the sides of the polygon.

As illustrated in FIG. 1, the pair of detection probes Pd in the first embodiment respectively come into contact with areas D1 and D2 of both the weldment 21 and the electrode 22 positioned at substantially equal distances from the weld zones 23*a* to 23*d*. Specifically, of the pair of detection probes Pd, one detection probe comes into contact with an area positioned at a center of the front surface of the weldment 21, and the other detection probe comes into contact with an area of an exposed surface of the electrode 22 exposed from the weldment 21, the area being positioned in the vicinity of the area of the weldment 21.

The operator 10 includes a plurality of push buttons provided around a display screen constituting the display 70, a touch sensor disposed in the display screen, a keyboard, a mouse, or the like. The operator 10 receives an input operation by a user utilizing the measuring device 1 and generates an operation signal indicating the received input operation.

Examples of the input operation by the user include an operation of pressing a power button, an operation of setting a measurement condition, an operation of instructing execution of a measurement process, and an operation of instructing the stopping of the measurement process.

Upon receipt of the input operation for setting the measurement condition, the operator 10 outputs an operation signal indicating the measurement condition to the controller 20 to record the operation signal in the storage 60. Further, upon receipt of the input operation for instructing execution of the measurement process, the operator 10 outputs an operation signal indicating execution of the measurement process to the controller 20.

The controller 20 is constituted by one or more processors. Examples of the processor include a central processor (CPU) and a microprocessor (MPU).

The controller 20 executes the measurement process for measuring the welding state of the measurement target 2. The controller 20 in the first embodiment issues an application command for applying a current to each of the weld zones 23*a* to 23*d* to the measurer 30.

The measurer 30 controls the operation of the application circuit 40 and the detection circuit 50 so as to simultaneously apply currents from the application circuits 40*a* to 40*d* to the weld zones 23*a* to 23*d*, respectively, and measure voltages generated by the areas of the weldment 21 or the electrode 22.

The areas of the weldment 21 are each disposed in a region where the voltage gradient is gentle as compared with those in the vicinities of the weld zones 23*a* to 23*d*. Similarly, the areas of the electrode 22 are each defined in a region where the voltage gradient is gentle as compared with those in the vicinities of the weld zones 23*a* to 23*d*.

Note that an interval between equipotential lines in the measurement target 2 when all currents are applied from the weldment 21 toward the electrode 22 is the same as an interval between equipotential lines in the measurement target 2 when all currents are applied from the electrode 22 toward the weldment 21. Therefore, the areas of the weldment 21 and the electrode 22 are each defined in the same region, that is, a region in which the voltage gradient is gentle, even when the direction of the current changes.

The combined voltage obtained by combining the voltages indicating the magnitudes of the voltage drops generated by the weld zones 23*a* to 23*d* is generated between the areas of the weldment 21 and the electrode 22. For example, in a case in which a portion of the weld zones 23*a* to 23*d* is defective, a voltage drop generated in the defective weld zone increases in magnitude in a state in which a current is applied in the same direction to each of the weld zones 23*a* to 23*d*, and thus the combined voltage between the areas of weldment 21 and the electrode 22 is increased.

The measurer 30 measures the combined voltage indicating a potential difference between the areas of the weldment 21 and the areas of the electrode 22. Then, the measurer 30 generates measurement information indicating the state of the plurality of weld zones 23a to 23d on the basis of the measured combined voltage. The measurer 30 outputs a measurement result indicating the measured combined voltage to the controller 20 to record the measurement result in the storage 60.

For example, the measurer 30 determines whether the welding state of the one group of weld zones 23a to 23d is defective on the basis of the measured combined voltage. As a specific example, a threshold value indicating the magnitude of the combined voltage when the welding states of all weld zones 23a to 23d are good is stored in advance in the storage 60, and the measurer 30 determines whether the measurement value of the combined voltage exceeds the threshold value.

When the measurement value of the combined voltage exceeds the threshold value, the measurer 30 determines that a portion of all weld zones 23a to 23d is defective, and generates state information indicating the determination. On the other hand, when the measurement value of the combined voltage does not exceed the threshold value, the measurer 30 determines that all weld zones 23a to 23d are good, and generates state information indicating the determination. The measurer 30 outputs the generated state information to the controller 20 as the measurement information described above.

In the first embodiment, the measurer 30 generates voltage information indicating the magnitude of the measured combined voltage as the measurement information. Then, the user is notified of this voltage information, making it possible for the user to determine that the welding state is good if the measurement value of the combined voltage indicated by the voltage information does not exceed the known threshold value.

Further, the measurer 30 issues an application command to the application circuit 40 to simultaneously apply currents to the one group of weld zones 23a to 23d, and issues a detection command to the detection circuit 50 to detect the combined voltage.

The application circuit 40 is constituted by the plurality of application circuits 40a to 40d. The application circuit 40 in the first embodiment includes the four application circuits 40a to 40d, and simultaneously applies currents to the one group of weld zones Pa1 to Pa4 from the application circuits 40a to 40d via the pairs of application probes 23a to 23d.

For example, each of the currents applied from the application circuit 40 to the weld zones 23a to 23d may be a direct constant current or an alternating constant current. However, when an alternating constant current is adopted as the applied current, desirably currents of the same phase are output from each of the application circuits 40a to 40d.

The magnitudes of the currents applied to the weld zones 23a to 23d may be current values that are equal to each other or may be current values that are different from each other. Further, the directions of the applied currents include two directions of a direction in which the current flows from the weldment 21 to the electrode 22 and a direction in which the current flows from the electrode 22 to the weldment 21, and all applied currents may be in the same direction or at least one applied current may be in a different direction.

The plurality of application circuits 40a to 40d apply currents to each of one or more weld zones exclusively selected among the weld zones 23a to 23d formed in the weldment 21.

In the first embodiment, the application circuits 40a to 40d correspond to the weld zones 23a to 23d on a one-to-one basis, and apply equal constant currents in the same direction to the different regions.

For example, the application circuit 40a applies a direct current equivalent to the other applied currents from the weldment 21 to the weld zone 23a, and the application circuit 40b applies a direct current equivalent to the other applied currents from the weldment 21 to the weld zone 23b. The application circuit 40c applies a direct current equivalent to the other applied currents from the weldment 21 to the weld zone 23c, and the application circuit 40d applies a direct current equivalent to the other applied currents from the weldment 21 to the weld zone 23d.

The detection circuit 50 detects the combined voltage obtained by combining the voltages indicating the magnitudes of the voltage drops generated by the respective weld zones 23a to 23d due to the application of the currents.

In the first embodiment, the detection circuit 50 detects the combined voltage between the area of the weldment 21 and the area of the electrode 22 via the pair of detection probes Pd. The detection circuit 50 outputs a detection signal indicating the magnitude of the detected combined voltage to the measurer 30. In the measurer 30, the measurement information is generated on the basis of the detection signal from the detection circuit 50 as described above.

The storage 60 is constituted by a random access memory (RAM) and a read only memory (ROM). The storage 60 stores the measurement information written by the controller 20. The storage 60 may be used as a holding circuit that holds the threshold values for determining the state of the plurality of weld zones 23a to 23d.

The storage 60 also stores a program for execution of the measurement process by the controller 20 in the first embodiment. That is, the storage 60 is a computer-readable storage medium in which a program for controlling each area of the measuring device 1 is recorded.

The display 70 is constituted by a light-emitting diode (LED) display, a liquid crystal panel, a touch panel, or the like for displaying an image. The display 70 displays, for example, the measurement information or the measurement condition received from the controller 20.

The communicator 80 is constituted by a communication circuit that communicates with an external device different from the measuring device 1. For example, the communicator 80 can receive the measurement condition from an external device in a wireless or wired manner through a network such as the Internet or a telephone network and transmit the measurement result to the external device.

Next, a method of measuring a welding state of the one group of weld zones 23a to 23d formed in the measurement target 2 will be described with reference to FIGS. 2 to 4.

Figure 2A:
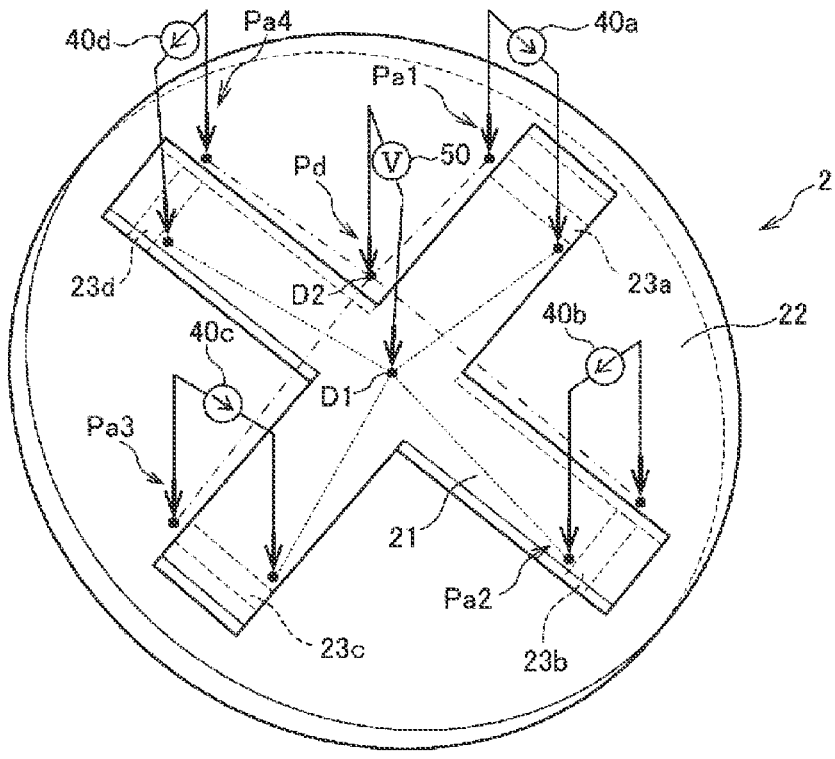
FIG. 2A is a diagram illustrating a connection relationship between the measuring device and a measurement target.
Figure 2B:
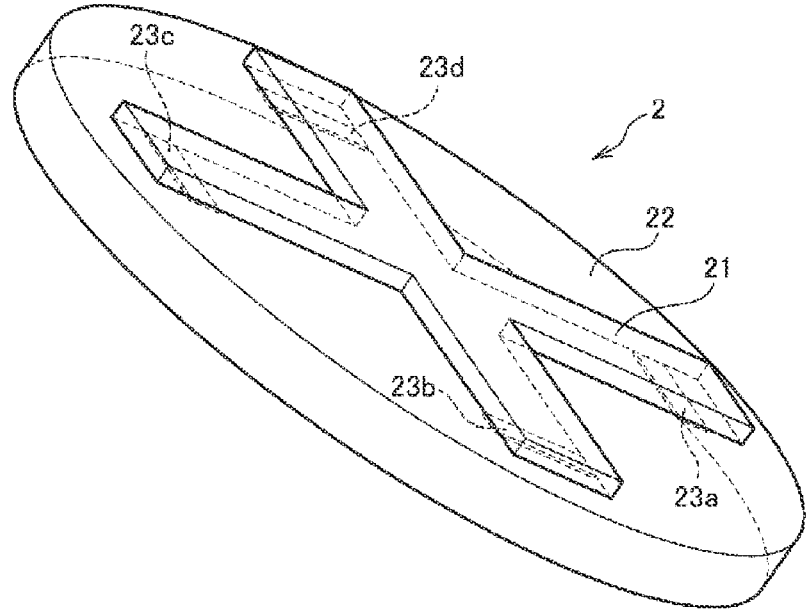
FIG. 2B is an external view illustrating a plurality of weld zones of the measurement target.

FIG. 2A is a diagram illustrating an example of a connection configuration between the measuring device 1 and the measurement target 2 according to the first embodiment. FIG. 2B is a perspective view illustrating the appearance of the measurement target 2. As illustrated in FIG. 2A and FIG. 2B, the group of weld zones 23a to 23d are formed w % ben the back surface of the weldment 21 is welded to the outer surface of the electrode 22 at four locations.

In the example illustrated in FIG. 2A, the application circuits 40a to 40d are constituted by constant current circuits that output equivalent direct currents. The four application circuits 40a to 40d respectively apply constant currents in the same direction to the weld zones 23a to 23d from areas of the electrode 22 positioned in the respective vicinities of the weld zones 23a to 23d via the pairs of application probes Pa1 to Pa4 illustrated in FIG. 1.

For the weld zone 23a, one probe of the pair of application probes Pa1 is in contact with an area of the exposed surface of the electrode 22 in the vicinity of the weld zone 23a. The other probe of the pair of application probes Pa1 is then in contact with an area defined on the front surface of the weldment 21 so as to cross over the weld zone 23a from the area of the electrode 22. Similarly, for the other weld zones 23b to 23d, the areas of both the weldment 21 and the electrode 22 are defined so as to cross over the corresponding weld zones.

In such a state, the detection circuit 50 detects, via the pair of detection probes Pd illustrated in FIG. 1, the combined voltage obtained by combining the voltages indicating the magnitudes of the voltage drops generated by each of the weld zones 23a to 23d.

The pair of detection probes Pd are both respectively in contact with areas D1 and D2 positioned at substantially equal distances from the four weld zones 23a to 23d. More specifically, one probe of the pair of detection probes Pd is in contact with the area D1 of the weldment 21 positioned at substantially equal distances from the four weld zones 23a to 23d. The other probe of the pair of detection probes Pd is in contact with the area D2 of the electrode 22 positioned at substantially equal distances from the four weld zones 23a and 23d.

Next, the areas D1 and D2 of the weldment 21 and the electrode 22 will be described with reference to FIG. 3.

Figure 3:
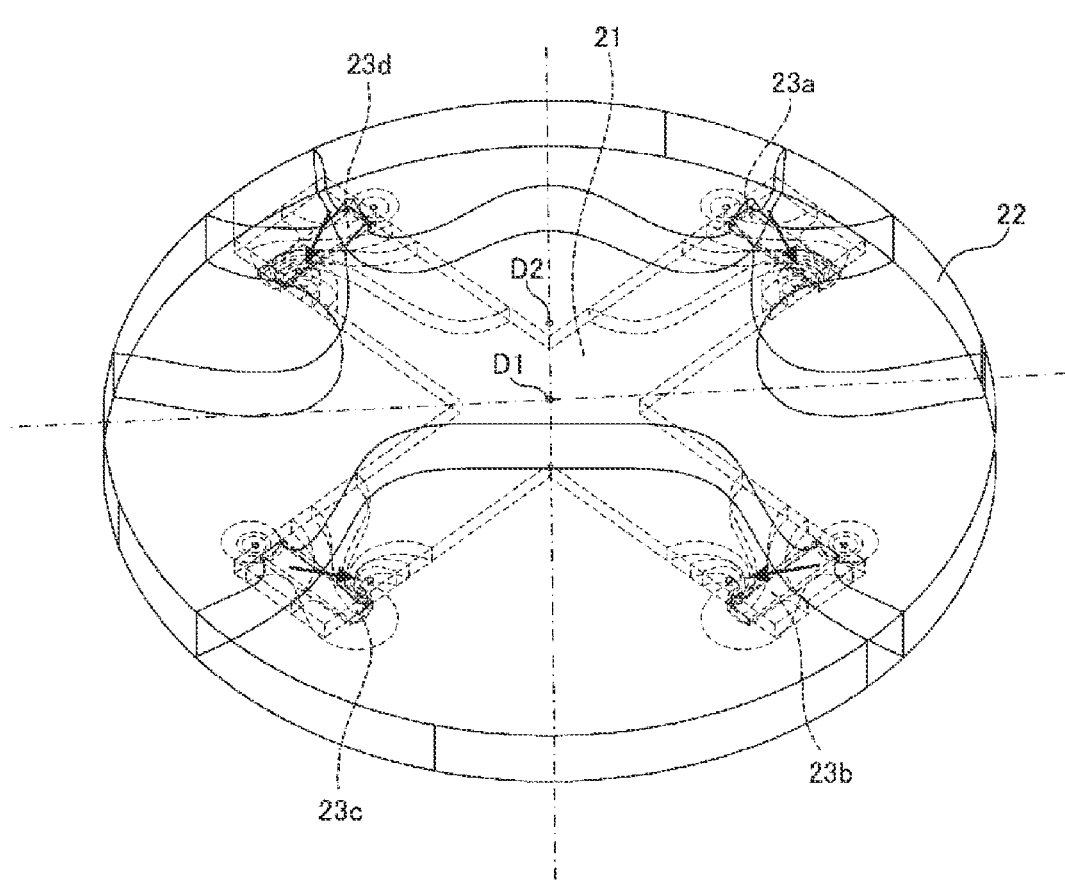
FIG. 3 is a diagram illustrating an example of a potential distribution formed in the measurement target in a state in which a current is applied to each of the weld zones.

FIG. 3 is a diagram illustrating a simulation result of a potential distribution in the measurement target 2 when constant currents of the same direction are applied from the application circuits 40a to 40d illustrated in FIG. 2A to the respective vicinities of the weld zones 23a to 23d of the weldment 21.

As indicated by the dashed line in FIG. 3, in the weldment 21, the interval between the equipotential lines in the vicinities of the weld zones 23a to 23d is dense, and the potential gradient is steep. Therefore, in this region, a detection error of the combined voltage increases due to positional deviation of one contact point (refer to FIG. 2A) of the detection probe Pd.

On the other hand, on or in the vicinity of each virtual line starting from the center of gravity of a quadrangle formed by the center points of the weld zones 23a to 23d and passing through the midpoints of the sides of the quadrangle, the interval between the equipotential lines is sparse and the potential gradient is gentle. Therefore, even if the contact point of the detection probe Pd on the weldment 21 is slightly deviated from the desired area D1, a variation in the detected value of the combined voltage is suppressed. Accordingly, the value of the combined voltage detected by the detection circuit 50 can be accurately detected.

Further, as illustrated by the solid lines in FIG. 3, in the electrode 22, a current path is wider than that of the weldment 21 and the direct current is applied from the front surface of the weldment 21. As a result, the interval between the equipotential lines is wider as compared with that of the potential distribution of the weldment 21. However, as with the potential distribution of the weldment 21, the potential gradient is steep in the vicinities of the weld zones 23a to 23d, and the potential gradient is gentle on or in the vicinity of each of the virtual lines described above.

Therefore, when a current is applied from the weldment 21 to each of the weld zones 23a to 23d, at least one probe of the detection probes Pd is preferably brought into contact with the area D1 of the weldment 21 positioned at substantially equal distances from each of the weld zones 23a to 23d.

Further, in the electrode 22, although the interval between the equipotential lines is sparse as compared with that of the potential distribution of the weldment 21, desirably the other probe of the detection probes Pd is similarly brought into contact with the area D2 of the electrode 22 positioned at substantially equal distances from each of the weld zones 23a to 23d.

In the first embodiment, as indicated by a dotted line and a one dot chain line in FIG. 2A, both probes of the pair of detection probes Pd respectively come into contact with the areas D1 and D2 of the weldment 21 and the electrode 22, which are positioned at substantially equal distances from the weld zones 23a to 23d.

Note that, in the first embodiment, the currents are applied from the weldment 21 to each of the weld zones 23a to 23d using the application circuits 40a to 40d. However, instead of this, the currents may be applied from the electrode 22 to each of the weld zones 23a to 23d.

Even in such a case, the intervals of the equipotential lines of both the weldment 21 and the electrode 22 do not change. Therefore, from the viewpoint of enhancing the detection accuracy of the combined voltage, preferably at least the other probe of the detection probes Pd is brought into contact with the area D2 of the electrode 22 positioned on or in the vicinity of any one of the virtual lines described above. In particular, preferably the other probe of the detection probes Pd is brought into contact with the area D2 of the electrode 22 positioned at substantially equal distances from the weld zones 23a to 23d.

Next, the relationship between the welding state of the one group of weld zones 23a to 23d and the voltage value of the combined voltage detected by the detection circuit 50 will be described with reference to FIG. 4.

FIG. 4 is a table for explaining the change in the combined voltage in accordance with the welding state of the one group of weld zones 23a to 23d. FIG. 4 shows, as an example, the measurement results of the combined voltages in a state in which a direct current of 1.0 [A] is applied from each of the application circuits 40a to 40d to the areas of the weldment 21.

As illustrated in FIG. 4, when the welding states of all weld zones 23a to 23d are good, the combined voltage is 6.7 [μV], and when any one of the weld zones 23a to 23d is defective, the combined voltage is approximately 10 [μV].

When the two weld zones 23a, 23d are defective, the combined voltage is 14.4 [μV], and when the three weld zones 23a, 23b, and 23c are defective, the combined voltage is 20.8 [μV].

Therefore, when the measurer 30 determines whether all of the welding states of the weld zones 23a to 23d are good, a first threshold value for determining whether the welding state is good is set to a value within a range from 7 [μV] to 9 [μV], for example, in consideration of measurement errors and the like. With the first threshold value thus set, the controller 20 can determine that all weld zones 23a to 23d are good when the measurement value of the combined voltage exceeds the first threshold value.

Similarly, a second threshold value for determining whether two weld zones are defective is set to a value within a range from 13 [μV] to 19 [μV], for example. Then, when the measurement value of the combined voltage exceeds the second threshold value, the controller 20 can determine that any two of the weld zones 23a to 23d are defective. Furthermore, a third threshold value for determining whether three weld zones are defective can be similarly defined.

In the first embodiment, the controller 20 causes the display 70 to display the measurement value of the combined voltage. This makes it possible for the user to confirm the measurement value of the combined voltage displayed on the display 70, and identify the number of weld zones in which the welding state is defective among the weld zones 23a to 23d in accordance with the measurement value.

In the example shown in FIG. 4, an example has been described in which equal currents are output in the same direction from the application circuits 40a to 40d, but the first embodiment is not limited thereto.

For example, the application circuits 40a to 40d may output currents having magnitudes different from each other. As a specific example, the currents output from the application circuits 40b to 40d are set to current values two times, three times, and four times the current output from the application circuit 40a, respectively. Accordingly, because the voltage value of the combined voltage when only the weld zone 23a is defective and the voltage value of the combined voltage when only the weld zone 23b is defective are different from each other, it is possible to identify the weld zone with a defective welding state among the weld zones 23a to 23d on the basis of the value of the combined voltage.

Further, the probe group P may be arranged so that the direction of the output power of at least one of the application circuits 40a to 40d is opposite to the direction of the output current from the other application circuits. For example, the output currents of the application circuits 40a to 40c may flow from the weldment 21 to the electrode 22, and the output current from the application circuit 40d may flow from the electrode 22 to the weldment 21. Even in such a case, in a state in which at least one of the weld zones 23a to 23d is defective, the voltage value of the combined voltage changes, making it possible to determine whether the welding state of the one group of the weld zones is good or defective.

As for the combined voltage, the voltage value of the combined voltage increases as a thickness of the weldment 21 decreases. Therefore, as the thickness of the weldment 21 decreases, the difference between the voltage value of the combined voltage when the welding state is defective and the voltage value of the combined voltage when the welding state is good increases, making it possible to improve the determination accuracy of the quality. Similarly, as the current path of the weldment 21 narrows, the voltage value of the combined voltage increases, making it possible to improve the determination accuracy.

Now, the operation of the measuring device 1 according to the first embodiment will be described with reference to FIG. 5.

Figure 5:
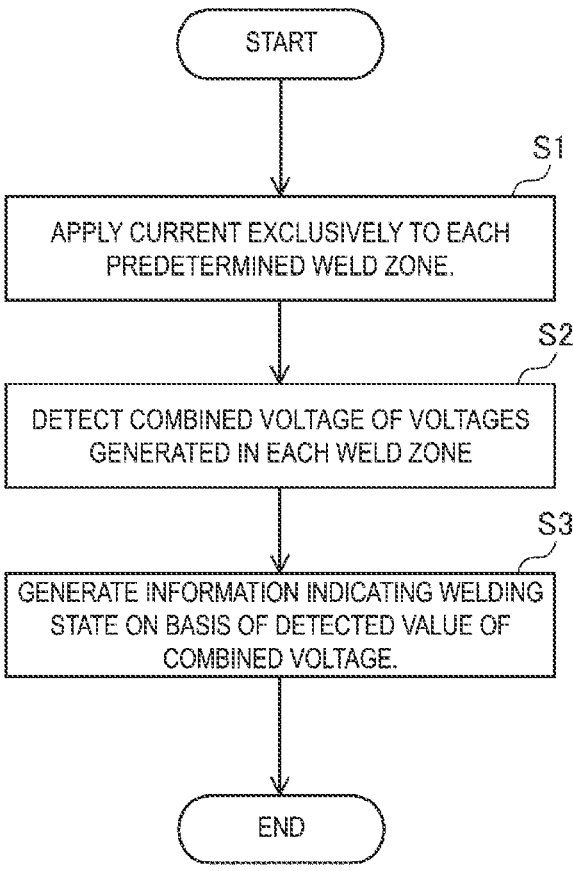
FIG. 5 is a flowchart illustrating an example of a processing procedure of a measuring method of measuring a state of a group of weld zones according to the first embodiment.

FIG. 5 is a flowchart illustrating an example of a processing procedure for a measuring method of measuring the welding state of the one group of weld zones 23a to 23d.

In step S1, the measuring device 1 applies currents to, among the weld zones 23a to 23d, each predetermined weld zone that differs from the others.

In the first embodiment, because the application circuits 40a to 40d and the weld zones 23a to 23d correspond to each other on a one-to-one basis, the measuring device 1 applies currents to the different regions so that the respective virtual straight lines for each weld zone connecting the area of the weldment 21 and the electrode 22 positioned in the vicinity of the weld zone do not intersect one another.

In step S2, the measuring device 1 detects the combined voltage obtained by combining the voltages generated by each of the weld zones 23a to 23d.

In the first embodiment, as illustrated in FIG. 2A, the measuring device 1 comes into contact with each of the areas of the weldment 21 and the electrode 22 which are positioned at substantially equal distances from the weld zones

23a to 23d, respectively. Then, the measuring device 1 detects the voltage between the areas of the weldment 21 and the electrode 22 as the combined voltage, and acquires the value of the detected combined voltage.

In step S3, the measuring device 1 generates measurement information indicating the welding state of the one group of weld zones 23a to 23d on the basis of the acquired detected value of the combined voltage.

In the first embodiment, the measuring device 1 calculates the measurement value of the combined voltage on the basis of the output signal of the detection circuit 50 and generates measurement information indicating the calculated measurement value. Then, the measuring device 1 outputs the generated measurement information to the display 70 or the communicator 80. Accordingly, the user is notified of the measurement information, making it possible for the user to identify or estimate the quality of the welding state of the one group of the weld zones in accordance with the voltage value of the combined voltage indicated by the measurement information.

When the processing of step S3 is completed, the series of processes of the measuring method illustrated in FIG. 5 ends.

Next, the operation and effects of the first embodiment will be described.

The measuring device 1 according to the first embodiment measures the state of the plurality of weld zones 23a to 23d formed when the weldment 21 is welded to the electrode 22 corresponding to the workpiece at a plurality of locations. This measuring device 1 includes the plurality of application circuits 40a to 40d that apply currents to each weld zone among the weld zones 23a to 23d. Furthermore, the measuring device 1 further includes the detection circuit 50 that detects the combined voltage obtained by combining the voltages indicating the magnitudes of voltage drops generated by each weld zone by the application of the currents by the application circuits 40a to 40d, and the controller 20 that outputs the information indicating the state of the plurality of weld zones 23a to 23d on the basis of the combined voltage detected by the detection circuit 50.

Further, the measuring method for measuring the state of the plurality of weld zones 23a to 23d in the first embodiment includes the plurality of application steps (S1) of applying a current to each weld zone and the detection step (S2) of detecting the combined voltage described above by applying the currents in the plurality of application steps. This measuring method further includes the processing step (S3) of outputting information indicating the state of the plurality of weld zones 23a to 23d on the basis of the combined voltage detected in the detection step.

According to these configurations, a current is applied to each of the weld zones, and thus the combined voltage generated in accordance with the voltage drops of each of the weld zones 23a to 23d indicates different values in accordance with the state of each of the weld zones 23a to 23d. Therefore, by detecting the combined voltage, it is possible to determine whether the plurality of weld zones 23a to 23d are defective.

Accordingly, it is possible to shorten the time required for measuring the state of the plurality of weld zones 23a to 23d as compared with a case in which the voltages generated in the weld zones 23a to 23d are detected at different times.

Further, the measuring device 1 according to the first embodiment includes the application probes Pa1 to Pa4 constituting the plurality of pairs of contacts connected to both ends of each of the application circuits 40a to 40d, and the detection probe Pd constituting another pair of contacts connected to both ends of the detection circuit 50.

The plurality of pairs of application probes Pa1 to Pa4 described above each come into contact with an area of the weldment 21 or an area of the electrode 22 in the vicinities of the plurality of weld zones 23*a* to 23*d*, respectively. Then, the other pair of detection probes Pd come into contact with the area D1 of the weldment 21 or the area D2 of the electrode 22 farther from the plurality of weld zones 23*a* to 23*d* than the areas of the weldment 21 or the areas of the electrode 22 with which the plurality of pairs of application probes Pa1 and Pa4 come into contact, respectively.

Specifically, one probe of the pair of detection probes Pd may be in contact with the area D1 separated from the plurality of weld zones 23*a* to 23*d* of the weldment 21 as compared with the area of the weldment 21 provided for each weld zone. Alternatively, the other probe may be in contact with the area D2 of the electrode 22 separated from the plurality of weld zones 23*a* to 23*d* as compared with the area of the weldment 21 provided for each weld zone.

In the weldment 21 and the electrode 22, the potential gradient in the vicinity of each area becomes gentler as the distance from the area to the respective weld zone 23*a* to 23*d* increases. Therefore, according to the configuration described above, when at least one probe of the pair of detection probes Pd is brought into contact with the area D1 or D2 of the weldment 21 or the electrode 22 having a gentle potential gradient, it is possible to suppress a measurement error of the combined voltage caused by positional deviation of the detection probes Pd.

Further, the pair of detection probes Pd in the first embodiment come into contact with the area D1 of the weldment 21 or the area D2 of the electrode 22 positioned on or in the vicinity of any one of the lines starting from the center of gravity of the polygon formed by the plurality of weld zones 23*a* to 23*d* and passing through the midpoints of the sides of the polygon.

As illustrated in FIG. 3, on the line starting from the center of gravity of the quadrangle formed by the weld zones 23*a* to 23*d* and passing through the midpoints of the sides of the quadrangle, the potential gradient is gentle as compared with those in the vicinities of the weld zones 23*a* to 23*d*. For example, the same is considered to be true for the measurement targets 2 with a weld zone forming a polygon such as a triangle and a pentagon.

Accordingly, according to the configuration described above, because the pair of detection probes Pd are disposed on or in the vicinity of any one of the lines passing from the center of gravity of the polygon through the midpoints of the sides, it is possible to suppress a decrease in measurement accuracy associated with positional deviation of the pair of detection probes Pd.

Further, the pair of detection probes Pd in the first embodiment come into contact with the areas D1 and D2 of the weldment 21 and the electrode 22 positioned at substantially equal distances from the weld zones 23*a* to 23*d*, respectively, as indicated by the dotted line and the one dot chain line in FIG. 2A. Specifically, one of the detection probes Pd comes into contact with the area D1 of the weldment 21 positioned at substantially equal distances from each of the weld zones 23*a* to 23*d*, and the other of the detection probes Pd comes into contact with the area D2 of the electrode 22 positioned at substantially equal distances from each of the weld zones 23*a* to 23*d*.

As illustrated in FIG. 3, the areas D1 and D2 of the weldment 21 and the electrode 22 positioned at substantially equal distances from the weld zones 23*a* to 23*d* are regions where the potential gradient is gentle. Therefore, according to the configuration described above, it is possible to accurately measure the combined voltage between the areas of the weldment 21 and the electrode 22.

The measuring device 1 may include the storage 60 as a holding circuit that holds the threshold values for determining the state of the plurality of weld zones 23*a* to 23*d*. In this case, when the combined voltage detected by the detection circuit 50 exceeds a threshold value, the controller 20 generates state information indicating that the state of the plurality of weld zones 23*a* to 23*d* is good as the information indicating the state of the plurality of weld zones 23*a* to 23*d*.

According to this configuration, in the measuring device 1, the controller 20 determines whether the state of the plurality of weld zones 23*a* to 23*d* is good on the basis of the combined voltage detected by the detection circuit 50. This eliminates the need for the user to determine whether the welding state is good or defective, making it possible for the user to easily identify the welding state.

Further, the plurality of application circuits 40*a* to 40*d* in the first embodiment apply currents in the same direction to different weld zones, specifically to the weld zones corresponding to the application circuits.

According to this configuration, the combined voltage increases monotonically as the number of weld zones with defective welding states among the weld zones 23*a* to 23*d* increases. This makes it possible to easily determine the number of weld zones having a defective welding state.

The embodiment described above is an example in which the application circuits 40*a* to 40*d* each apply a current to one different weld zone. However, the application circuits 40*a* to 40*d* may each apply a current to a plurality of different weld zones. In the following, an embodiment in which a current is applied from the application circuit 40 to each of a plurality of weld zones will be described.

Second Embodiment

Figure 6:
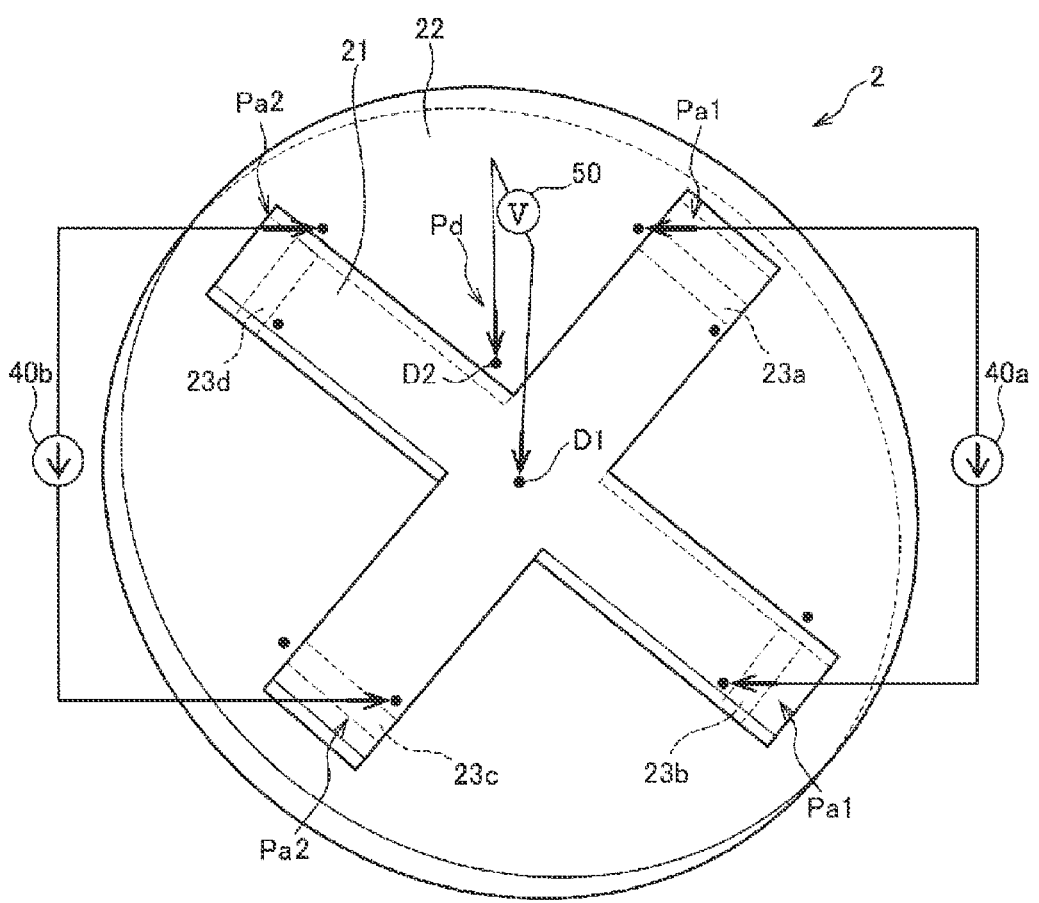
FIG. 6 is a diagram illustrating a connection relationship between the measuring device and the measurement target according to a second embodiment.

FIG. 6 is a diagram for explaining a method of measuring the state of the weld zones 23*a* to 23*d* according to a second embodiment. The second embodiment differs from the first embodiment in the number of application circuits for applying currents to the four weld zones 23*a* to 23*d*.

A measuring device 1*A* according to the second embodiment includes the two application circuits 40*a* and 40*b* instead of the four application circuits 40*a* to 40*d* constituting the measuring device 1 illustrated in FIG. 1. The detection circuit 50 has the same configuration as that in the first embodiment, and thus the same reference signs will be used and redundant descriptions will be omitted.

The two application circuits 40*a* and 40*b* apply currents to the same number of different weld zones. In the second embodiment, the application circuit 40*a* applies currents to the two weld zones 23*a* and 23*b*, and the application circuit 40*b* applies currents to the two weld zones 23*c* and 23*d* different from the weld zones 23*a* and 23*b*.

Regarding the pair of application probes Pa1 connected to both ends of the application circuit 40*a*, one application probe is in contact with the area of the weldment 21 positioned in the vicinity of the weld zone 23*b*, and the other application probe is in contact with the area of the electrode 22 positioned in the vicinity of the other weld zone 23*a*.

Regarding the pair of application probes Pa2 connected to both ends of the application circuit 40*b*, one application probe is in contact with the area of the weldment 21 positioned in the vicinity of the weld zone 23*c*, and the other application probe is in contact with the area of the electrode 22 positioned in the vicinity of the other weld zone 23*d*.

Thus, one of the pair of application probes Pa1 or Pa2 come into contact with the area positioned in the vicinity of any one of the weld zone 23*b* and 23*c* exclusively selected from the first N weld zones of 2N weld zones (where N=2 in the second embodiment) of the weld zones 23*a* to 23*d*. Further, the other of the pair of application probes Pa1 or Pa2 come into contact with the area positioned in the vicinity of any one of the weld zones 23*a* and 23*d* exclusively selected from the remaining N weld zones of the 2N weld zones. Note that N is set to two in the second embodiment, but N may be a natural number of 3 or greater.

Figure 7:
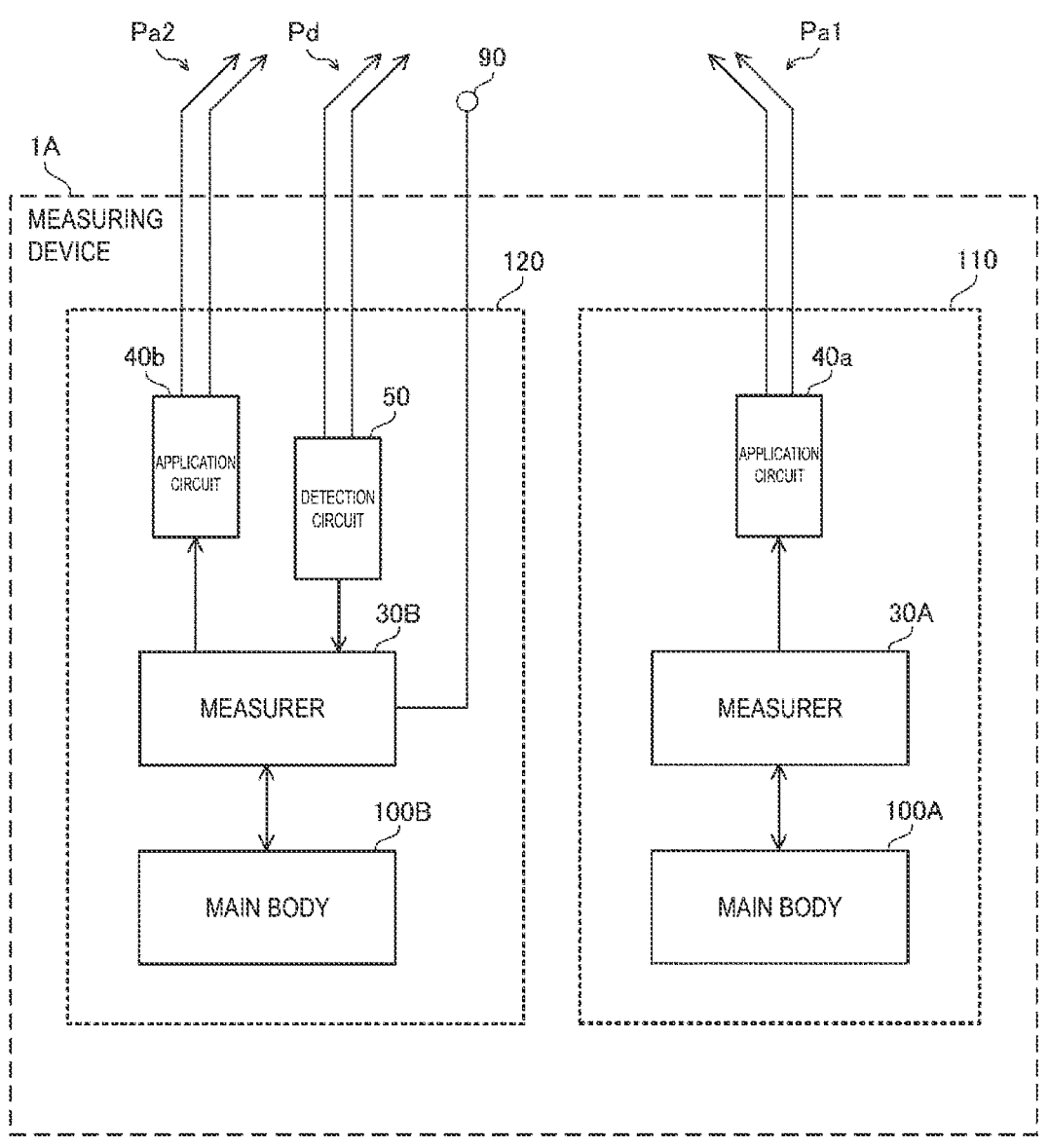
FIG. 7 is a block diagram illustrating a configuration of the measuring device.

FIG. 7 is a block diagram illustrating a functional configuration of the measuring device 1A according to the second embodiment.

The measuring device 1A includes a measuring instrument 110 and a measuring instrument 120. The measuring instrument 110 and the measuring instrument 120 are constituted by a tester or a resistance meter, for example.

The measuring instrument 110 includes a measurer 30A and a main body 100A in addition to the application circuit 40*a* illustrated in FIG. 6. The measuring instrument 120 includes a measurer 30B, a temperature sensor 90, and a main body 100B in addition to the application circuit 40*b* and the detection circuit 50 illustrated in FIG. 6.

The measurer 30A and the measurer 30B have the same function as that of the measurer 30 illustrated in FIG. 1. In the second embodiment, each of the main body 100A and the main body 100B includes the operator 10, the controller 20, the storage 60, the display 70, and the communicator 80 illustrated in FIG. 1.

The temperature sensor 90 detects the temperature of at least one of the weld zones 23*a* to 23*d* or the ambient temperature of the weld zones. The temperature sensor 90 generates a temperature signal indicating a magnitude of the detected temperature and outputs the temperature signal to the measurer 30B.

As in the first embodiment, the measurer 30B measures the combined voltage of the voltages indicating voltage drops generated by the weld zones 23*a* to 23*d* on the basis of the detected signal output from the detection circuit 50. Furthermore, in the second embodiment, the measurer 30B executes a correction process of correcting the measurement value of the combined voltage in accordance with the temperature signal from the temperature sensor 90.

Specifically, a correction table indicating the relationship between the temperature of the weld zone and a correction amount of the combined voltage is stored in advance in the storage 60 of the main body 100B. In the correction table, for example, the correction amount when the temperature of the weld zone is 25° C. is set to zero. Further, as the temperature of the weld zone rises above 25° C., the correction amount becomes less than zero, and as the temperature of the weld zone falls below 25° C., the correction amount becomes greater than zero.

Then, when the temperature signal is acquired from the temperature sensor 90, the measurer 30B refers to the correction table stored in the storage 60 and acquires the correction amount corresponding to the temperature indicated by the temperature signal. The measurer 30B calculates the measurement value of the combined voltage by adding the acquired correction amount to the voltage value of the combined voltage indicated by the detection signal.

In this way, the measurer 30B corrects the measurement value of the combined voltage in accordance with the temperature signal from the temperature sensor 90. The measurer 30B outputs the corrected measurement value of the combined voltage to the controller 20 of the main body 100B.

Note that, when a temperature variation of the weld zones 23*a* to 23*d* is small, the correction process described above may be omitted. Further, this correction process may be executed in the measurer 30 in the first embodiment.

Next, the relationship between the welding states of the weld zones 23*a* to 23*d* and the voltage values of the combined voltage in the second embodiment will be described with reference to FIG. 8.

FIG. 8 is a table for explaining the change in the combined voltage according to the welding states of the weld zones 23*a* to 23*d*. FIG. 8 shows an example of the measurement results of combined voltages in a state in which a direct current of 2.0 [A] is applied from each of the application circuit 40*a* and the application circuit of 40*b* to the weldment 21.

As shown in FIG. 8, when the welding states of all four weld zones 23*a* to 23*d* are good, the combined voltage is 10.1 [μV]. Then, when only the weld zone 23*a* is defective, the combined voltage is 11.3 [μV], and when only the weld zone 23*b* is defective, the combined voltage is 16.6 [μV]. When the two weld zones 23*b* and 23*d* are both defective, the combined voltage is 18.3 [μV].

Therefore, when it is to be determined whether all welding states of the weld zones 23*a* to 23*d* are good in the measurer 30B, the first threshold value used for the determination is set to, for example, 10.5 [μV] in consideration of measurement errors and the like. With the first threshold value thus set, the controller 20 can determine that all weld zones 23*a* to 23*d* are good when the measurement value of the combined voltage exceeds the first threshold value.

Similarly, the second threshold value for determining whether the two weld zones 23*b* and 23*d* are defective is set to 17 [μV], for example. When the measurement value of the combined voltage exceeds the second threshold value, the controller 20 can determine that the weld zones 23*b* and 23*d* are defective.

Thus, by acquiring the voltage values of the combined voltages of all patterns of the defective states that may occur in the weld zones 23*a* to 23*d* through an experiment or a simulation to determine the threshold values, it is possible to determine whether the welding state of each of the weld zones 23*a* to 23*d* is good or defective.

Note that, in the second embodiment, an example in which the current is applied to two weld zones each from each of the application circuits 40*a* and 40*b* has been described, but the second embodiment is not limited thereto. For example, because the combined voltage need only change when either one of the weld zones is defective, generating a voltage drop in the weld zone by the output current of one application circuit, a configuration may be adopted in which currents are applied to three or more weld zones from one application circuit as long as such conditions are met.

Next, the operation and effects of the second embodiment will be described.

The measuring device 1A according to the second embodiment measures the state of the plurality of weld zones 23*a* to 23*d* formed when the weldment 21 is welded to the electrode 22 corresponding to the workpiece at a plurality of locations. Then, the measuring device 1 includes the plurality of application circuits 40*a* to 40*b* that apply currents to, among the weld zones 23*a* to 23*d*, each of a plurality of (for example, two) weld zones, the number of which is less than the number of weld zones. Furthermore, the measuring device 1A further includes the detection circuit 50 that detects the combined voltage obtained by combining the voltages indicating the magnitudes of voltage drops generated by the plurality of weld zones due to the application of the currents by the application circuits 40a and 40b, and the controller 20 that outputs information indicating the state of the plurality of weld zones 23a to 23d on the basis of the combined voltage detected by the detection circuit.

Further, the measuring method of measuring the state of the plurality of weld zones 23a to 23d in the second embodiment includes the plurality of application steps (S1) of applying currents to a plurality of (two, for example) weld zones, and the detection step (S2) of detecting the combined voltage described above due to the current application in the plurality of application steps. This measuring method further includes the processing step (S3) of outputting information indicating the state of the plurality of weld zones 23a to 23d on the basis of the combined voltage detected in the detection step.

According to these configurations, the currents are applied to each of the plurality of weld zones, and thus the combined voltage generated in accordance with the voltage drops of each of the weld zones indicates a different value according to each state of the weld zones 23a to 23d. Therefore, by detecting the combined voltage, it is possible to determine whether the plurality of weld zones 23a to 23d are defective.

Accordingly, it is possible to shorten the measurement time of the plurality of weld zones 23a to 23d as compared with a case in which the voltages generated by the weld zones 23a to 23d are detected at different times.

Further, the measuring device 1A according to the second embodiment includes the application probes Pa1 and Pa2 constituting the plurality of pairs of contacts connected to both ends of the respective application circuits 40a and 40b, and the detection probe Pd constituting the other pair of contacts connected to both ends of the detection circuit 50.

Then, one probe of each pair of the plurality of pairs of application probes Pa1 and Pa2 comes into contact with an area positioned in the vicinity of any one weld zone exclusively selected from the first N weld zones of the 2N weld zones (where N is a natural number of 2 or greater) among the plurality of weld zones 23a to 23d. Further, the other probe of each of the plurality of pairs of application probes Pa1 and Pa2 comes into contact with an area positioned in the vicinity of any one of the weld zones exclusively selected from the remaining N weld zones of the 2N weld zones.

Desirably, the area brought into contact with one probe of each pair of the plurality of pairs of application probes Pa1 and Pa2 is one area among the weldment 21 and the electrode 22, and the area brought into contact with the other probe of each pair of the plurality of pairs of application probes Pa1 and Pa2 is the other area among the weldment 21 and the electrode 22. With this configuration, the measurement accuracy can be improved.

Specifically, one application probe of the pair of application probes Pa1 comes into contact with the area of the weldment 21 positioned in the vicinity of any one weld zone 23b exclusively selected from the first two weld zones 23b and 23c among the four weld zones 23a to 23d. Then, one application probe of the pair of application probes Pa2 comes into contact with the area of the weldment 21 positioned in the vicinity of any one weld zone 23c exclusively selected from the first two weld zones 23b and 23c.

Further, the other application probe of the pair of application probes Pa1 comes into contact with the area of the electrode 22 positioned in the vicinity of the any one weld zone 23a exclusively selected from the remaining two weld zones 23a and 23d, and the other application probe of the pair of application probes Pa2 comes into contact with the area of the electrode 22 positioned in the vicinity of the any one weld zone 23d exclusively selected from the remaining two weld zones 23a and 23d.

According to this configuration, as in the first embodiment, because currents flow through each of the weld zones 23a to 23d, the voltage value of the combined voltage changes in accordance with the welding states of each of the plurality of weld zones 23a to 23d, as shown in FIG. 8. This makes it possible to determine whether the welding states of the weld zones 23a to 23d are good or defective in accordance with the magnitude of the combined voltage detected by the detection circuit 50.

In addition, in the second embodiment, with the configuration being the same as that of the first embodiment, the same operation and effects as those of the first embodiment can be obtained.

Third Embodiment

Figure 9:
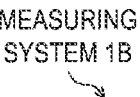
FIG. 9 is a cross-sectional view illustrating a configuration of a measuring system according to a third embodiment.
Figure 9:
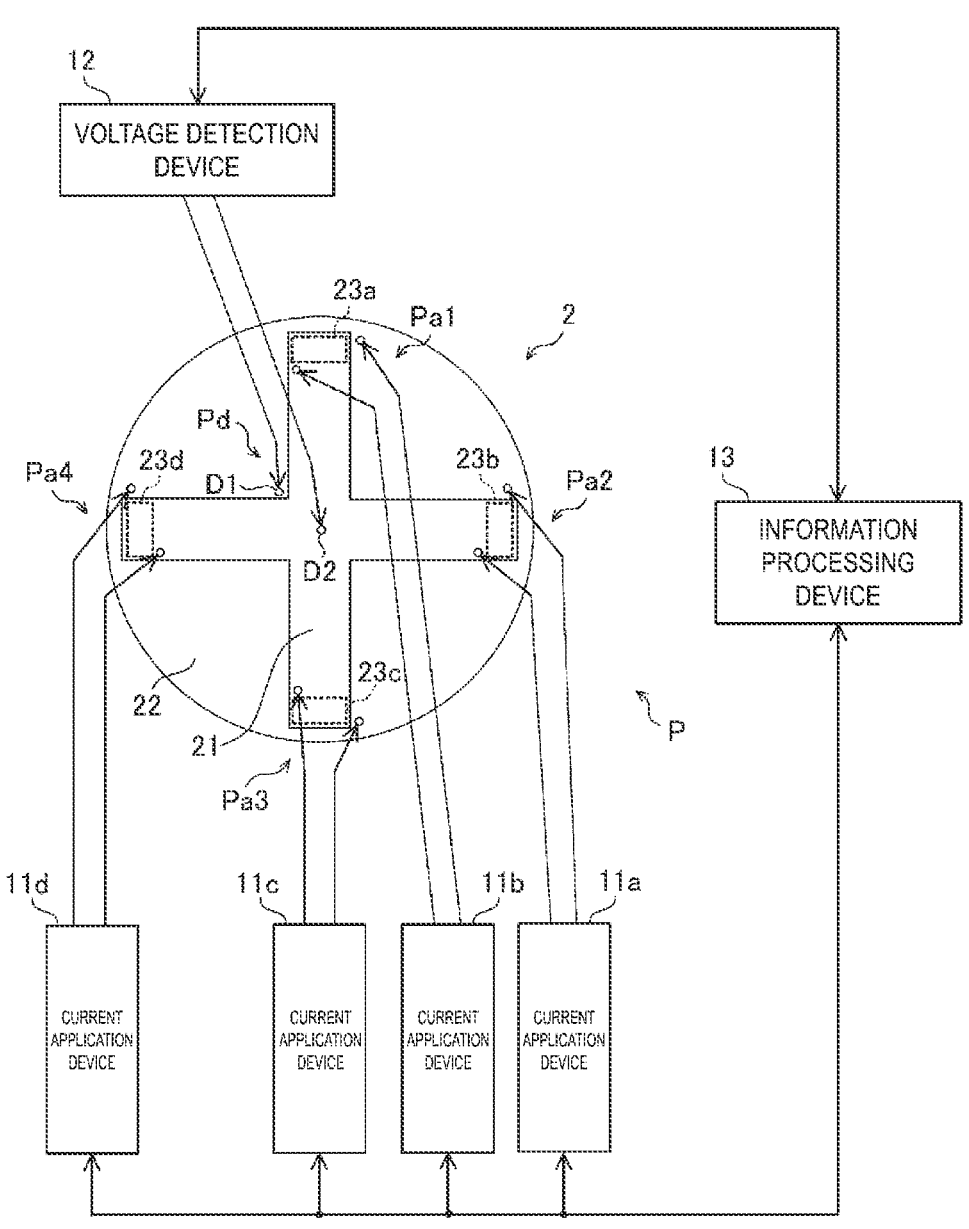

FIG. 9 is a diagram illustrating a configuration of a measuring system 1B for measuring the weld zones 23a to 23d of the measurement target 2 according to a third embodiment.

The measuring system 1B includes the probe group P, a plurality of current application devices 11a to 11d, a voltage detection device 12, and an information processing device 13. In the probe group P according to the third embodiment, as in the first embodiment, four pairs of application probes Pa1 to Pa4 are disposed across over the four weld zones 23a to 23d, respectively. The pair of detection probes Pd are disposed in contact with the areas D1 and D2 having substantially equal distances to the weld zones 23a to 23d of the weldment 21 and the electrode 22, respectively.

The plurality of current application devices 11a to 11d are devices that apply currents to each of one or more weld zones, and function as the application circuits 40a to 40d in the first embodiment, respectively.

In the third embodiment, the current application device 11a applies a current to the weld zone 23a through the pair of application probes Pa1, and the current application device 11b applies a current to the weld zone 23b through the pair of application probes Pa2. Furthermore, the current application device 11c applies a current to the weld zone 23c through the pair of application probes Pa3, and the current application device 11d applies a current to the weld zone 23d through the pair of application probes Pa4.

Thus, the four current application devices 11a to 11d apply currents to the weld zones 23a to 23d via the four pairs of application probes Pa1 to Pa4, respectively.

The voltage detection device 12 is a device that detects the voltage obtained by combining voltages indicating the magnitudes of the voltage drops generated by each of the weld zones 11a to 11 _d_ due to the application of currents by the current application devices 23a to 23d, and functions as the detection circuit 50 in the first embodiment. The voltage detection device 12 of the third embodiment detects the combined voltage generated between the pair of detection probes Pd by the currents applied to each of the weld zones 23a to 23d.

The information processing device 13 is a device that outputs information indicating the state of the plurality of weld zones on the basis of the combined voltage detected by the voltage detection device 12, and functions as the measurer 30 in the first embodiment. As in the first embodiment, the information processing device 13 of the third embodiment generates measurement information indicating the state of the plurality of weld zones 23a to 23d on the basis of the detected combined voltage. Then, the information processing device 13 displays the measurement information, transmits the measurement information to an external source, and stores the measurement information.

In the third embodiment, an example has been described in which the four current application devices 11a to 11d apply currents to the four weld zones 23a to 23d. However, the embodiment is not limited thereto. For example, at least one of the current application devices 11a to 11d may be configured to apply a current to the plurality of weld zones 23a to 23d.

In the third embodiment, an example has been described in which the current application devices 11a to 11d generate measurement information indicating the state of the weld zones 23a to 23d by applying a current to one weld zone exclusively selected among the four weld zones 23a to 23d. However, no such limitation is intended. For example, as in the second embodiment, the measurement information indicating the state of the weld zones 23a to 23d may be generated by applying a current to a plurality of the weld zones each.

Next, the operation and effects of the third embodiment will be described.

The measuring system 1B according to the third embodiment measures the state of the plurality of weld zones 23a to 23d formed w % ben the weldment 21 is welded to the electrode 22 corresponding to the workpiece at a plurality of locations. The measuring system 1B includes one or more current application devices 11a to 11d that apply a current to one or more weld zones exclusively selected among the four weld zones 23a to 23d, and a voltage detection device 12 that detects a voltage obtained by combining the voltages indicating the magnitudes of the voltage drops generated by each weld zone due to the application of the current by the one or more current application devices 11a to 11d. The measuring system 1B further includes the information processing device 13 that outputs information indicating the state of the plurality of weld zones 23a to 23d on the basis of the voltage obtained by combining the voltages generated by each weld zone.

According to this configurations, as in the first embodiment and the second embodiment, currents are applied to one or more weld zones exclusively selected, causing the combined voltage generated in association with the voltage drops of each of the weld zones 23a to 23d to indicate a different value depending on the state of each of the weld zones 23a to 23d. Therefore, by detecting the combined voltage, it is possible to determine whether the plurality of weld zones 23a to 23d are defective.

Accordingly, it is possible to shorten the time required for measuring the state of the plurality of weld zones 23a to 23d as compared with a case in which the voltages generated in the weld zones 23a to 23d are detected at different times.

Although embodiments of the present invention have been described above, the embodiments merely illustrate part of application examples of the present invention, and no limitation of the technical scope of the present invention to the specific configurations of the embodiments described above is intended.

For example, although the four weld zones 23a to 23d are measured in the embodiments described above, two, three, five, or more weld zones may be measured.

For example, although the shape of the weldment 21 is a cross shape in the embodiments described above, the shape may be a circular shape, an elliptical shape, or a rectangular shape.

Further, although the operator 10, the display 70, and the communicator 80 are provided in the measuring devices 1 and 1A in the embodiments described above, at least one of the functions of the operator 10, the display 70, and the communicator 80 may be omitted from the measuring devices 1 and the 1A.

The present application claims priority based on JP 2021-166846 filed on Oct. 11, 2021 in Japan, and the present application claims priority based on JP 2022-143278 filed on Sep. 8, 2022 in Japan, the entire contents of which are incorporated by reference herein.

REFERENCE SIGNS LIST

1, 1A Measuring device
1B Measuring system
11a to 11d Current application device
12 Voltage detection device
13 Information processing device
30, 30A, 30B Measurer (processor)
40, 40a to 40d Application circuit
50 Detection circuit
Pa1 to Pa4 Pair of application probes (pair of contacts of application circuit)
Pd Pair of detection probes (pair of contacts of detection circuit)

The invention claimed is:

1. A measuring device which measures a state of a plurality of weld zones formed when a weldment is welded to a workpiece at a plurality of locations, the measuring device comprising:

a plurality of application circuits configured to apply a current to each of one or more weld zones exclusively selected among the plurality of weld zones;

a detection circuit configured to detect a voltage obtained by combining voltages indicating magnitudes of voltage drops generated respectively by the plurality of weld zones due to the application of the current; and a processor configured to output information indicating the state of the plurality of weld zones on the basis of the voltages combined.

2. The measuring device according to claim 1, comprising:

a plurality of pairs of contacts connected to both ends of each of the application circuits; and another pair of contacts connected to both ends of the detection circuit, wherein each contact of the plurality of pairs of contacts comes into contact with a corresponding one of a plurality of first areas of the weldment or the workpiece in the vicinity of a weld zone of the plurality of weld zones, and each contact of the other pair of contacts comes into contact with a corresponding one of a plurality of second areas of the weldment or the workpiece farther from the plurality of weld zones than the plurality of first areas with which the plurality of pairs of contacts come into contact.

3. The measuring device according to claim 2, wherein the other pair of contacts come into contact with the plurality of second areas of the weldment or the workpiece positioned on or in the vicinity of any one line passing through a center of gravity of a polygon formed by the plurality of weld zones and midpoints of respective sides of the polygon.

4. The measuring device according to claim 2, wherein the other pair of contacts come into contact with the plurality of second areas of the weldment and the workpiece positioned at substantially equal distances from each of the plurality of weld zones.

5. The measuring device according to claim 2, wherein each one pair of the plurality of pairs of contacts come into contact with the plurality of first areas positioned in the vicinity of any one weld zone exclusively selected from first N weld zones among 2N weld zones (where N is a natural number of 2 or greater) among the plurality of weld zones, and each other pair of the plurality of pairs of contacts come into contact with the plurality of first areas positioned in the vicinity of any one weld zone exclusively selected from remaining N weld zones among the 2N weld zones.

6. The measuring device according to claim 1, further comprising:

a holding circuit configured to hold a threshold value for determining the state, wherein when the voltage detected by the detection circuit exceeds the threshold value, the processor generates, as the information, state information indicating that the state of the plurality of weld zones is good.

7. The measuring device according to claim 1, wherein each of the plurality of application circuits applies the current in the same direction to the one or more weld zones, the weld zones being different from each other.

8. A measuring method for measuring a state of a plurality of weld zones formed when a weldment is welded to a workpiece at a plurality of locations, the measuring method comprising:

applying a current to one or more weld zones exclusively selected among the plurality of weld zones;

detecting a voltage obtained by combining voltages indicating magnitudes of voltage drops generated by each of the one or more weld zones due to the application of the current; and outputting information indicating the state of the plurality of weld zones on the basis of the voltages combined.

9. A measuring system which measures a state of a plurality of weld zones formed when a weldment is welded to a workpiece at a plurality of locations, the measuring system comprising:

one or more current application devices configured to apply a current to each of one or more weld zones exclusively selected among the plurality of weld zones;

a voltage detection device configured to detect a voltage obtained by combining voltages indicating magnitudes of voltage drops generated respectively by the plurality of weld zones due to the application of the current; and an information processing device configured to output information indicating the state of the plurality of weld zones on the basis of the voltages combined.

* * * * *